Dec. 23, 1969  E. S. KANBAR  3,486,081

EXTENSION THERMOSTAT AND ADAPTER ASSEMBLY

Filed Dec. 21, 1966

INVENTOR.
Elliott S. Kanbar
BY
ATTORNEY ent Office 3,486,081
Patented Dec. 23, 1969

3,486,081
EXTENSION THERMOSTAT AND ADAPTER ASSEMBLY
Elliott S. Kanbar, 333 E. 69th St.,
New York, N.Y. 10021
Filed Dec. 21, 1966, Ser. No. 603,503
Int. Cl. H01h 47/26, 50/12
U.S. Cl. 317—132                                4 Claims

ABSTRACT OF THE DISCLOSURE

A thermostatic switch and adapter assembly for controlling the operation of an electrical heater or air conditioner unit as a function of temperature in a region remote from the unit. The assembly makes use of a low voltage relay whose solenoid is connected in series with the thermostatic switch, whereby the voltage at the switch contacts can be relatively low, thereby making it possible to use a thin extension line to the thermostat without creating a hazardous condition.

---

Figure 1:
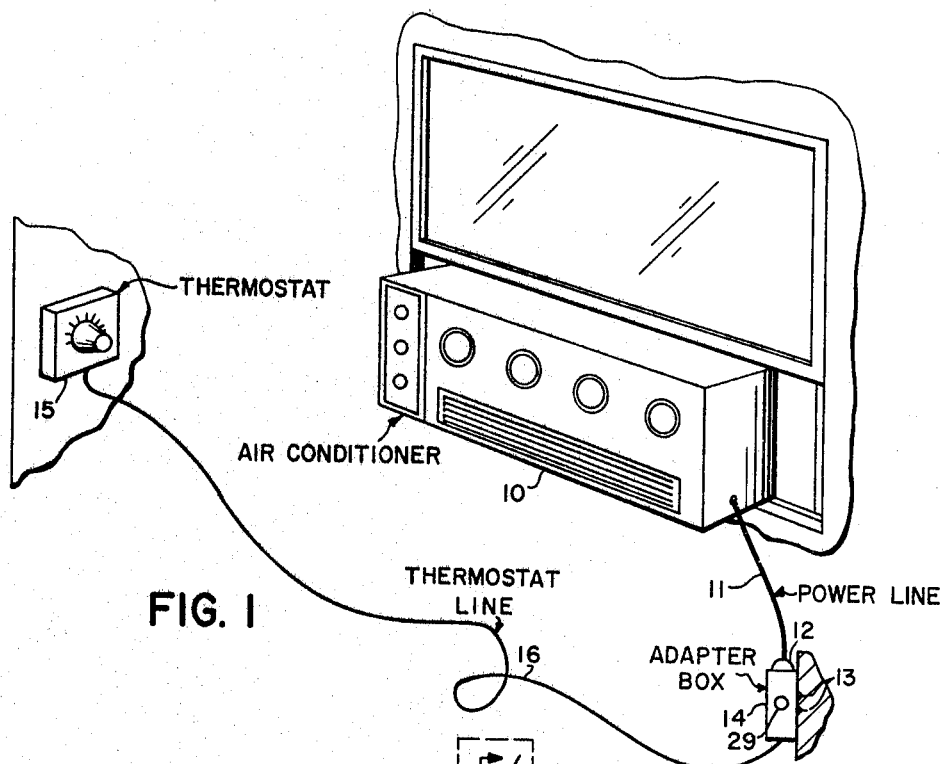

This invention relates generally to thermostatically-controlled devices, and more particularly to an extension thermostat and adapter assembly for use with an air conditioner or electric heater unit to regulate the operation thereof in accordance with temperature conditions prevailing at a point remote from the unit.

In a window-mounted air conditioner or with a portable electric heater, the unit usually includes a thermostatically-operated switch which senses ambient temperature and causes the unit to turn on and off intermittently in order to maintain a desired temperature level. The drawback to such conventional arrangements is that since the thermostat is housed within the unit, it is responsive to temperature conditions which exist only in the region directly surrounding the unit, rather than those generally prevailing within the room in which the unit functions.

Hence while air temperature in the immediate vicinity of a window-mounted air conditioner may be, say, 70° F., the temperature elsewhere in the room may run as high as 80° F. The thermostat in the unit is insensitive to this fact and will not cause the conditioner to operate to properly reduce the room temperature. Similarly, with an electric heater, while the temperature in the immediate vicinity may be as high as 80° F., the temperature elsewhere in the room may be below 70° F., hence the thermostat within the unit will shut off the heater despite the need for continuing heat.

In a permanent air-conditioning or heating installation, this problem is avoided, for the thermostat is separate from the unit and is located on a wall in the living room or elsewhere in a house close to where the occupants are usually found, so that the regulation which takes place is such as to adjust the temperature to a level suited to the comfort of the occupants.

In an attempt to solve this problem for units which lack thermostats or which incorporate the thermostat within the unit, adapters have been proposed which make it possible to position a thermostatic switch at a point remote from the unit, the switch being connected in series with the power line for the unit. The difficulty with this arrangement which renders it commercially unfeasible, is that the operating current for the unit is then caused to flow through the line leading to the remote thermostat. This is highly undesirable, for the average conditioner or heater draws relatively heavy current in the order of 7½ to fifteen amperes and greater, hence the thermostat line must be as heavy as the power line. Since the thermostat line or cable is relatively long, it is not safe to leave this line unprotected, for it may create a fire hazard. Moreover, the heavy current flowing through the thermostatic switch gives rise to sparking and arcing, as a consequence of which the switch contacts are quickly eroded and the thermostat has a short operating life.

Accordingly, it is the main object of this invention to provide an extension thermostat and an adapter assembly for use with an air conditioner or heater unit, which assembly makes use of a light extension line for the thermostat having a low current-carrying capacity.

A significant feature of the invention resides in the fact that the switching action for the unit is effected by a relay whose switching contacts have a high-current carrying capacity, whereas the relay which requires relatively little current to activate is controlled by the thermostatic switch.

More specifically, it is an object of this invention to provide an assembly of the above-described type making use of a direct-current, low-voltage relay whose solenoid is connected in series with the thermostatic switch, whereby the voltage at the contacts of the switch can be relatively low, thereby making it possible to use a thin extension line to the thermostat without creating a hazardous condition, and at the same time minimizing arcing at the thermostatic switch contacts.

Also an object of the invention is to provide an adapter having a selector switch to render it usable with a heater or an air conditioner.

Still another object of the invention is to provide an assembly of the above-described type which may be manufactured at modest cost, which is efficient and reliable in operation, and which is easily and quickly installed by an unskilled person.

Briefly stated, these objects are accomplished in an assembly comprising an adapter box containing a relay which is connected through a step-down transformer or other voltage-reducing means to an A-C outlet which is ordinarily intended for the air conditioner or heater unit power line, the relay solenoid being connected to such means in series with a remote thermostatic switch by way of a low-current carrying line, the relay including a contact switch connecting the A-C outlet through a selector switch to a receptacle for the plug attached to the power line for the unit, whereby when the thermostatic switch is closed, the relay is actuated to close or open a circuit to the associated unit, depending on the position of the selector switch or the connection at the terminals. In practice, the relay may be an electromagnetically-actuated mechanical or a mercury switch device, or a solid state SR relay.

For a better understanding of the invention, as well as other objects and further features thereof, reference is made to the following detailed description to be read in conjunction with the accompanying drawing, wherein:

FIG. 1 shows in perspective the thermostatic switch

Figure 2:
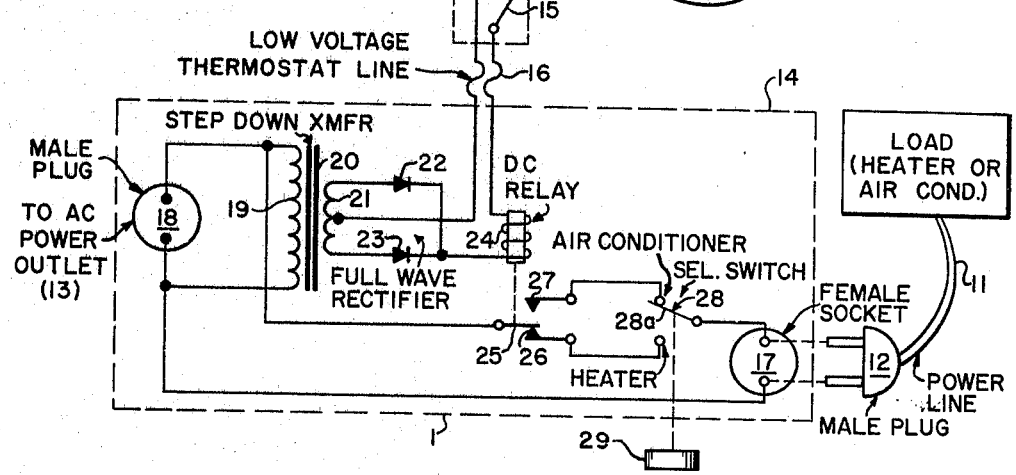

3 and adapter assembly of the invention installed for use with an air conditioner; and FIG. 2 is the schematic circuit of this arrangement.

Referring now to the drawing, and more particularly to FIG. 1, the assembly in accordance with the invention is illustrated in connection with a standard air-conditioner unit 10 mounted in a window. This unit has a power line 11 provided with a male plug 12 which ordinarily will be inserted in a nearby A-C power outlet 13. The typical air conditioner operates on 110 or 220 volts A-C power and draws at least 7½ to fifteen amperes of current. Hence power line 11 must be relatively heavy and well insulated to carry this heavy current. It is also normally of short length.

The assembly comprises an adapter box 14 and a remote thermostatic switch 15 connected to the box via a relatively light, two-wire extension line 16 which may be of any desired length. Thermostatic switch 15 is mounted at any desired position in the room and can be of the usual bimetallic design. The thermostat also includes a regulator knob to adjust the position of a fixed contact with respect to the movable element, thereby to fix the temperature setting at which the switch closes.

Thus when used for air-conditioning, the setting may be made such as to cause the thermostatic switch to close when the temperature in the region of the switch rises above 72° F., or any other desired value, the closing of the switch causing the air conditioner to operate until the temperature drops to the desired level. In practice, the thermostatic switch has a hysteresis characteristic such that if set at 72° F., it will close at this temperature, but will not open until the temperature falls to, say, 69° F. This prevents excessive on-off operation of the air conditioner. The thermostatic switch operation is reversed for heating purposes, so that by the use of a back contact, the switch may be caused to open when the temperature rises above a set value.

As shown in FIG. 2, the adapter box 14 includes a female socket 17 into which the plug 12 for the air-conditioner line is inserted, and a pair of male prongs 18 which project from the box, the prongs being insertable into the A-C power outlet 13 on the wall. The box is quite compact and is supported on the wall simply by the inserted prongs.

Prongs 18 are connected to the primary winding 19 of a step-down transformer 20 whose center-tapped secondary winding 21 is connected to a pair of solid state rectifiers 22 and 23 arranged in series opposition. The junction of the two diodes is connected in series with the coil of a D-C relay 24 and the contacts of thermostatic switch 15 to the center-tap of secondary winding 21 via the thermostat extension line 16.

Relay 24 is provided with an armature 25 which normally engages a fixed back contact 26 and which when energized engages a fixed front contact 27. The fixed contacts 26 and 27 are connected to the poles of a double-pole, single-throw switch 28, whose movable contact 28a is connected to one terminal of female socket 17, the other terminal of which is connected to one side of primary 19, the other side of the primary being connected to armature 25 of the relay. Selector switch 28 is operated by a knob 29 on the exterior of the adapter box.

The step-down ratio of transformer 20 depends on the voltage for which the assembly is intended, for some air conditioners operate at 220 volts, while others (and heaters) operate at 110 volts A-C. The relay is designed to operate at a low voltage, say 24 volts, and is of the D-C type. The output of secondary 21 is full-wave rectified by the diodes and is applied to the relay through thermostatic switch 15.

Hence when switch 15 closes, the relay is energized. The advantage of a D-C relay is that it is free of chatter and provides a positive operation. However, in lieu of a transformer to reduce the voltage, the relay may be operated through voltage-reducing resistors, or operated directly from line voltage, in which event the operating voltage of the relay is equal to the line voltage (i.e., 110 volts). But since the relay draws relatively little current, the line 16 may still be of low-current carrying capacity. While a D-C relay is preferred, the relay may also be of the A-C type, in which event, one may dispense with the rectifiers.

In the arrangement shown, selector switch 28 has its movable contact 28a connected to the pole leading to the front contact 27 of the relay, this being the set-up for an air-conditioner operation. Thus when the thermostatic switch 15 closes, indicating a rise in room temperature above the desired level, the relay is energized and armature 25 is shifted from its normal position to engage contact 27, thereby completing a circuit between the power outlet 13 and the air conditioner through power line 11.

With the selector switch adjusted to engage the pole leading to relay contact 26, the arrangement is for heater operation wherein when thermostatic switch 15 is closed because the room is at the desired temperature, relay 24 is energized to break the connection between the power line and the A-C outlet, but when thermostatic switch 15 is opened when the room temperature is too low, the power connection is restored.

In operating with an air conditioner or heater unit which includes within it a thermostatic switch, the switch is turned to its maximum setting, thereby keeping the switch permanently closed, and placing the unit under the control of the remote unit. The relay 24 in the adapter box is preferably of the mercury type in which the solenoid actuates a plunger to cause mercury to rise within an enclosure to engage fixed contacts. The reason such a relay is desirable, is not only because of its high-current carrying capacity, but also because of its freedom from clicking noises ordinarily encountered with conventional armature types. Since the adapter box is to be used in a home, such clicking sounds may be undesirable, particularly with sleeping occupants.

In lieu of a selector switch, a relay may be provided having two sets of terminals, one set being normally opened and the other normally closed. The normally open set can be used for air conditioner control, such that when the relay is actuated, the terminal set is caused to close to operate the air conditioner. The other set can be used for the reverse action to control a heater.

While there has been shown and described a preferred embodiment of extension thermostat and adapter assembly in accordance with the invention, it will be appreciated that many changes and modifications may be made therein without, however, departing from the essential spirit of the invention.

What I claim is:

1. A thermostatic switch and adapter assembly for controlling the operation of an electrical heater or air conditioner unit as a function of temperature in a region remote from said unit, said unit being powered from an electrical outlet located on a wall, said assembly comprising:

(a) a thermostatic switch, which is mountable in said region, (b) an adapter box having a pair of prongs projecting therefrom which is insertable into the power outlet normally intended for the plug of the relatively heavy current power-line of the unit in use, and a female receptacle having a pair of connecting elements to receive said plug, said prongs supporting said box against said wall, (c) a relay disposed in said box, said relay effecting a connection between said pair of prongs and said pair of elements, said relay including an energizing coil, normally open contacts which are closed when said relay is energized, and normally closed contacts which are opened when said relay is energized, (d) a relatively low current line extending from said thermostatic switch to said box and connecting said switch in series with said relay coil and a source of energizing voltage derived from said power outlet, and (e) a selector switch mounted on said box to connect either said normally open or normally closed contacts to said elements to render said assembly operative for either an air conditioner or heater unit.

2. An assembly as set forth in claim 1, wherein said relay operates at a voltage substantially below the line voltage and further including means in said box to reduce the voltage derived from the power outlet to the operating level of the relay.

3. An assembly as set forth in claim 1, wherein said relay is a D-C relay and further including a rectifier circuit in said source.

4. An assembly as set forth in claim 1, wherein said relay is a mercury relay.

References Cited

UNITED STATES PATENTS

| | | | |
|---|---|---|---|
| 2,967,981 | 1/1961 | Wise | 317—124 |
| 3,273,020 | 9/1966 | Murphey | 317—132 X |
| 3,337,778 | 8/1967 | Becker | 317—149 |

LEE T. HIX, Primary Examiner

G. GOLDBERG, Assistant Examiner

U.S. Cl. X.R.

236—1; 307—117